(12) United States Patent
Fujimoto et al.

(10) Patent No.: US 7,617,371 B2
(45) Date of Patent: Nov. 10, 2009

(54) STORAGE CONTROLLER AND METHOD FOR CONTROLLING THE SAME

(75) Inventors: Takeo Fujimoto, Odawara (JP); Toshio Nakano, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 257 days.

(21) Appl. No.: 11/214,002

(22) Filed: Aug. 30, 2005

(65) Prior Publication Data
US 2006/0282641 A1    Dec. 14, 2006

(30) Foreign Application Priority Data
Jun. 13, 2005  (JP)  ............................. 2005-172092

(51) Int. Cl.
G06F 12/00   (2006.01)
G06F 12/02   (2006.01)
G06F 12/08   (2006.01)

(52) U.S. Cl. .................. 711/165; 711/147; 711/170; 711/173

(58) Field of Classification Search .............. 711/147, 711/165, 170, 173
See application file for complete search history.

(56) References Cited

U.S. PATENT DOCUMENTS

| | | | | |
|---|---|---|---|---|
| 6,810,462 | B2 * | 10/2004 | Matsunami et al. | 711/112 |
| 6,823,442 | B1 * | 11/2004 | Cameron | 711/220 |
| 7,139,873 | B1 * | 11/2006 | Ruster et al. | 711/113 |
| 7,409,494 | B2 * | 8/2008 | Edwards et al. | 711/114 |
| 7,415,573 | B2 * | 8/2008 | Murayama et al. | 711/114 |
| 7,424,590 | B2 * | 9/2008 | Shinozaki et al. | 711/170 |

(Continued)

FOREIGN PATENT DOCUMENTS

JP    2003-015915    1/2003

(Continued)

OTHER PUBLICATIONS

Microsoft. Microsoft Windows XP—View disk propreties. Archive. org date of May 8, 2005. http://www.microsoft.com/resources/documentation/windows/xp/all/proddocs/en-us/dm_view_disk_properties.mspx.*

Primary Examiner—Sanjiv Shah
Assistant Examiner—Samuel Dillon
(74) Attorney, Agent, or Firm—Brundidge & Stanger, P.C.

(57) ABSTRACT

An object of the present invention is to provide a storage controller capable of facilitating extension of storage capacity while suppressing investment related to storage capacity.

The present invention has achieved the storing of system configuration information including content of a definition, set externally, of a virtual volume with storage capacity that is larger than a real storage capacity composed of the storage capacity of a storage device unit, and content of a definition, set externally, of at least one of a real volume formed as a result of dividing the real storage capacity, and a pool area; and communicating the storage capacity of the virtual volume based on the stored system configuration information in response to a storage capacity confirmation request from the host system, and, based on the system configuration information, writing or reading relevant data to or from a relevant address position in the storage device unit in response to a data input/output request from the host system designating an address in the real volume, and writing or reading relevant data to or from the pool area in response to a data input/output request from the host system designating an address in the virtual volume other than the real volume.

8 Claims, 8 Drawing Sheets

U.S. PATENT DOCUMENTS

| | | |
|---|---|---|
| 7,467,273 B2 * | 12/2008 | Ishida et al. ................. 711/163 |
| 2003/0009619 A1 * | 1/2003 | Kano et al. .................. 711/112 |
| 2004/0039875 A1 | 2/2004 | Kuwata |
| 2004/0260841 A1 | 12/2004 | Mathew et al. |
| 2005/0021562 A1 | 1/2005 | Idei et al. |
| 2005/0108292 A1 | 5/2005 | Burton et al. |
| 2007/0113007 A1 * | 5/2007 | Murayama et al. .......... 711/114 |
| 2007/0168634 A1 * | 7/2007 | Morishita et al. ............ 711/170 |
| 2007/0214338 A1 * | 9/2007 | Mizuno et al. .............. 711/170 |
| 2007/0233992 A1 * | 10/2007 | Sato ........................... 711/170 |
| 2007/0239954 A1 * | 10/2007 | Sakashita et al. ............ 711/165 |

FOREIGN PATENT DOCUMENTS

JP  2005-31929  2/2005

* cited by examiner

FIG.8A (CONVENTIONAL METHOD)

|  | INITIAL PHASE | 0.5 YEARS LATER | 1.0 YEARS LATER | 1.5 YEARS LATER | 2.0 YEARS LATER |
|---|---|---|---|---|---|
| FULL CAPACITY | 2.488x | 2.488x | 2.488x | 2.488x | 2.488x |
| UTILIZATION | 40.2% | 48.2% | 57.9% | 69.5% | 83.3% |
| INVESTMENT | 2.488y | - | - | - | - |
| ACCUMULATED AMOUNT | 2.488y | 2.488y | 2.488y | 2.488y | 2.488y |

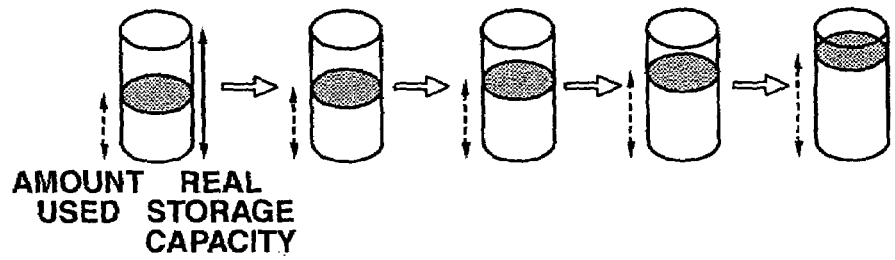

AMOUNT USED   REAL STORAGE CAPACITY

FIG.8B (METHOD ACCORDING TO EMBODIMENT)

|  | INITIAL PHASE | 0.5 YEARS LATER | 1.0 YEARS LATER | 1.5 YEARS LATER | 2.0 YEARS LATER |
|---|---|---|---|---|---|
| FULL CAPACITY | 1.200x | 1.440x | 1.728x | 2.074x | 2.488x |
| UTILIZATION | 83.3% | 83.3% | 83.3% | 83.3% | 83.3% |
| INVESTMENT | 1.200y | 0.192y | 0.186y | 0.174y | 0.135y |
| ACCUMULATED AMOUNT | 1.200y | 1.392y | 1.578y | 1.752y | 1.887y |

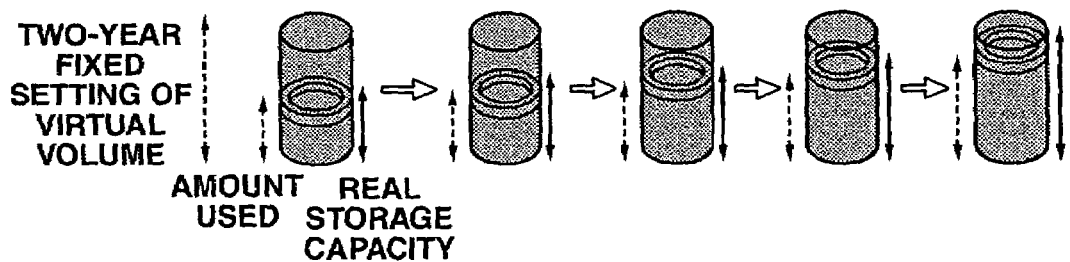

TWO-YEAR FIXED SETTING OF VIRTUAL VOLUME

AMOUNT USED   REAL STORAGE CAPACITY

STORAGE CONTROLLER AND METHOD FOR CONTROLLING THE SAME

CROSS-REFERENCE TO RELATED APPLICATION

This application relates to and claims priority from Japanese Patent Application No. 2005-172092, filed on Jun. 13, 2005, the entire disclosure of which is incorporated herein by reference.

BACKGROUND OF THE INVENTION

1. Field of the Invention

The present invention relates to a storage controller and a method for controlling the same, and specifically relates to those that are suitable to be adopted in a storage system wherein a storage area is virtualized and provided to a host system.

2. Description of the Related Art

In recent years, in the storage field, a technique called "virtualization" has been studied and advocated for storage management simplification and load distribution.

As a conventional example of virtualization, a method where a SAN (storage area network) including storage systems and host systems using those storage systems is connected to a management server, and the management server collectively manages the storage areas of the storage systems connected to the SAN upon virtualizing them has been suggested. In this method, the management server receives data input/output requests from the host systems to the storage systems, and then allocates storage areas in the storage systems to the respective host systems.

Also, for the purpose of effectively using the SAN storage capacity, Japanese Patent Application Laid-Open Publication No. 2005-031929 discloses a technique wherein when a host system lacks storage capacity, unused storage capacity allocated to another host system is released and then allocated to the host system lacking storage capacity.

However, in order to use this technique, it is necessary to have a management server, and also to provide extra storage capacity in advance for future needs. Moreover, when a reallocation of storage capacity occurs, a problem arises in that a re-initialization, reset or similar of the databases on the host system side, and the software included in the host system for managing storage areas of the storage system (hereinafter, referred to as "storage area managing software") will be required.

SUMMARY OF THE INVENTION

Recently, as a result of technological progress, hard disk drive performance has been improved daily, while the cost per unit storage capacity for a storage system has been reduced daily. Accordingly, for a storage system user, it is advantageous in terms of performance and cost to gradually add on hard disk drives to a minimal hard disk drive while monitoring the usage status of the storage capacity, rather than providing in advance storage capacity that would be needed in the future.

However, in order to add a hard disk drive to a storage system, not only work on the storage system, but also work on the host system, such as the re-initialization and reset of the databases and storage area managing software as mentioned above will be required. Thus, a problem arises in that a decrease in the interval between adding hard disk drives increases the number of additions of hard disk drives and will impose a heavy burden on a storage system manager.

The present invention has been made taking the above points into consideration, and is intended to provide a storage controller capable of facilitating an extension of storage capacity while suppressing the accompanying investment.

The present invention for solving the aforementioned problems is a storage controller for controlling data input/output between a host system, and a storage device unit for storing data. The storage controller includes an adapter unit for writing or reading relevant data to or from the storage device unit in response to a data input/output request from the host system; and a memory for storing system configuration information including externally-set definition content of a virtual volume having a storage capacity that is larger than a real storage capacity composed of the storage capacity of the storage device unit, and externally-set definition content of at least one of a real volume formed as a result of dividing the real storage capacity, and a pool area, the adapter unit communicating the storage capacity of the virtual volume based on the system configuration information stored in the memory in response to a storage capacity confirmation request from the host system, and, based on the system configuration information, writing or reading the relevant data to or from a relevant address position in the storage device unit in response to a data input/output request from the host system designating an address in the real volume, and writing or reading the relevant data to or from the pool area in response to a data input/output request from the host system designating an address in the virtual volume other than the real volume.

As a result, in this storage controller, the storage capacity of a virtual volume is initially communicated to a host system as the storage capacity of the storage device unit. Therefore, when the storage capacity of the storage device unit is extended to that of the virtual volume, the extension can be conducted irrespective of the host system. Furthermore, until that extension, a pool area is used for a data input/output request designating an address in the virtual volume other than the real volume, as a buffer until the storage capacity of the storage device unit is extended, so no failure will arise even when a data input/output request designating an address in the virtual volume other than the real volume is received from the host system.

The present invention is also a method for controlling a storage controller controlling data input/output between a host system, and a storage device unit for storing data. The method includes a first step of storing system configuration information including externally-set definition content of a virtual volume having a storage capacity larger than a real storage capacity composed of storage capacity of the storage device unit, and externally-set definition content of at least one of a real volume formed as a result of dividing the real storage capacity, and a pool area; and a second step of communicating the storage capacity of the virtual volume based on the stored system configuration information in response to a storage capacity confirmation request from the host system, and, based on the system configuration information, writing or reading the relevant data to or from a relevant address position in the storage device unit in response to a data input/output request from the host system designating an address in the real volume, and writing or reading the relevant data to or from the pool area in response to an data input/output request from the host system designating an address in the virtual volume other than the real volume.

As a result, according to this method for controlling a storage controller, the storage capacity of a virtual volume is initially communicated to a host system as the storage capacity of a storage device unit. Therefore, when the storage capacity of the storage device unit is extended to that of the virtual volume, the extension can be conducted irrespective of the host system. Furthermore, until that extension, a pool area is used for a data input/output request designating an address in the virtual volume other than the real volume, as a buffer until the storage capacity of the storage device unit is extended, so no failure will arise even when a data input/output request designating an address in the virtual volume other than the real volume is received from the host system.

According to the present invention, even when the storage capacity of a storage device unit is gradually extended, the accompanying work on the host system can be omitted, and thus, the burden on a storage controller manager caused by the gradual extension of the storage capacity of the storage device unit can be reduced. Thus, a storage controller that can facilitate an extension of storage capacity while suppressing the accompanying investment, and a method for controlling that storage controller can be achieved.

BRIEF DESCRIPTION OF THE DRAWINGS

FIG. 8A shows a table and diagram explaining the accumulated investment required when a desired storage capacity is obtained according to a conventional method; and FIG. 8B shows a table and diagram explaining the accumulated investment required when a desired storage capacity is obtained according to the method described in the embodiment.

DETAILED DESCRIPTION OF THE PREFERRED EMBODIMENTS

An embodiment of the present invention will be described below with reference to the drawings.

(1) Configuration of a Network System 1 according to the Embodiment

Figure 1:
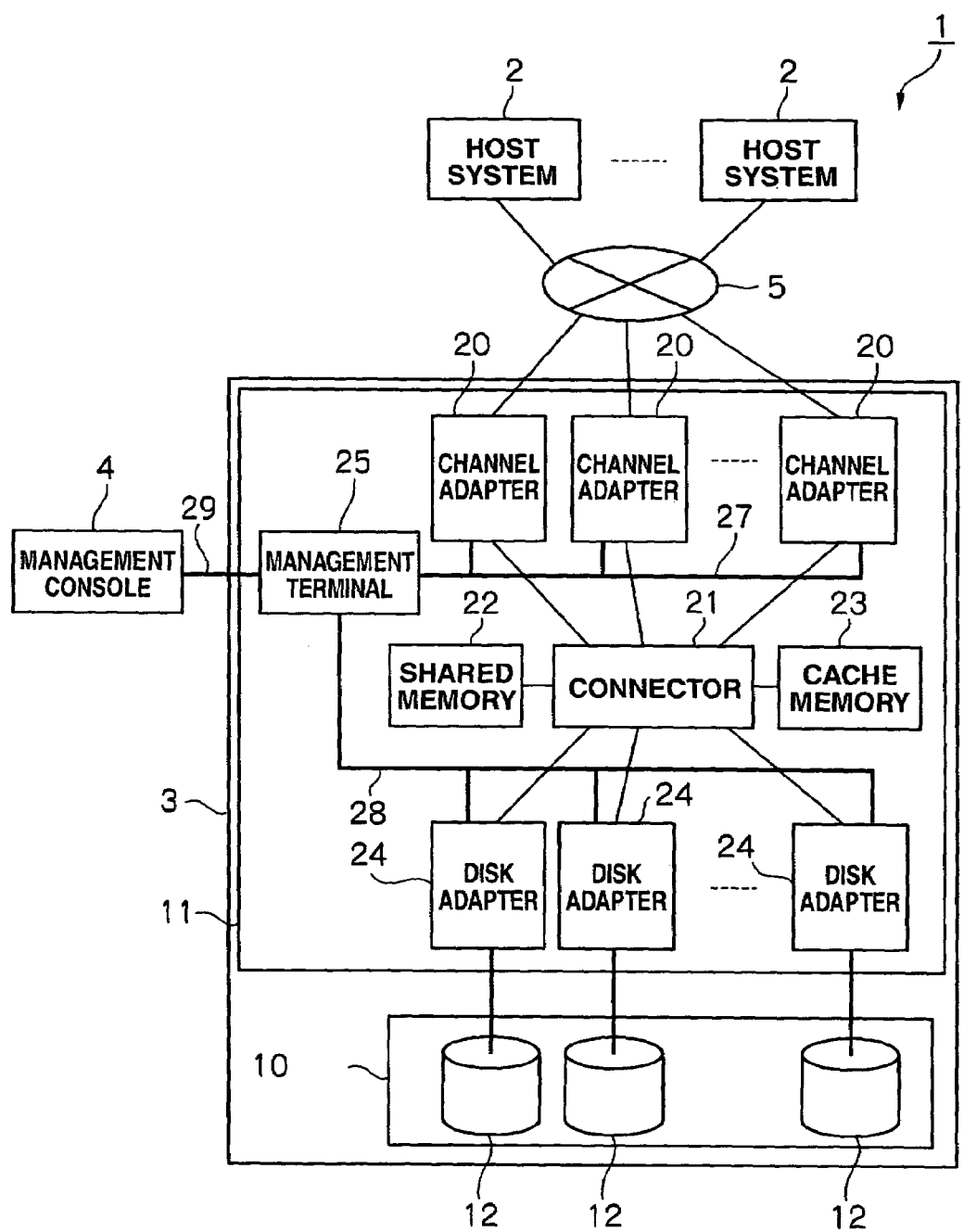
FIG. 1 is a block diagram showing an example of a storage system configuration using a storage controller according to an embodiment of the present invention.

FIG. 1 indicates an example of a network system 1 configuration using a storage system according to the embodiment. The network system 1 includes a plurality of host systems 2, a storage system 3 and a management console 4.

Each host system 2 is a computer system including information processing resources, such as a CPU (central processing unit) and memory, and consists of a personal computer, work station, main frame or similar. The host system 2 has an information input device (not shown), such as a keyboard, switch, pointing device, or microphone, and an information output device (not shown), such as a monitor display, or a speaker.

The host systems 2 are connected to a storage system 3 via a network 5 formed of, for example, a SAN, a LAN, the Internet, or a public or dedicated line. The communication between the host systems 2 and the storage system 3 via the network 5 is conducted in accordance with fiber channel protocol when the network 5 is a SAN, and is conducted in accordance with a TCP/IP (Transmission Control Protocol/Internet Protocol) when the network 5 is a LAN.

The storage system 3 includes a storage device unit 10 comprised of a plurality of respective disk units for storing data, and a control unit 11 for controlling data input/output to or from the storage device unit 10.

The storage device unit 10 contains a plurality of expensive disk devices 12 such as SCSI (Small Computer System Interface) disks, or inexpensive disk devices 12 such as SATA (Serial AT Attachment) disks or optical disks.

Each disk device 12 in the storage device unit 10 is operated by the control unit 11 in the RAID system. In a physical storage area provided by one or more disk devices 12, one or more logical volumes (hereinafter, referred to as "logical volume[s]") are set. Data is stored in units of blocks of a predetermined size in the logical volume (hereinafter referred to as a "logical block").

Each logical volume is provided with a unique identifier (hereinafter, referred to as an "LU [Logical Unit number]"). In the case of this embodiment, data is input/output upon designating an address that is a combination of the LU, and a unique number provided to each logical block (hereinafter, referred to as an "LBA [Logical Block Address]").

Meanwhile, the control unit 11 consists of a plurality of channel adapters 20, a connector 21, a shared memory 22, a cache memory 23, a plurality of disk adapters 24, and a management terminal 25.

Each channel adapter 20 is constructed as a microcomputer system having a microprocessor, memory and a communication interface, and the like, and also it has a port for connecting with the network 5. The channel adapter 20 interprets and executes various commands transmitted from the host systems 2 via the network 5. The port of each channel adapter 20 is assigned a network address identifying the channel adapter (e.g., IP address or WWN), thereby enabling each channel adapter 20 to individually behave as NAS (Network Attached Storage).

The connecter 21 is connected to the channel adapters 20, the shared memory 22, the cache memory 23 and the disk adapters 24. Transmissions of data or commands between the channel adapters 20, the shared memory 22, the cache memory 23 and the disk adapters 24 are conducted via the connecter 21. The connecter 21 consists of a switch, a bus, or the like, such as a very high speed crossbar switch that performs data transmission by high-speed switching.

The shared memory 22 and the cache memory 23 are memories shared by the channel adapters 20 and the disk adapters 24. The shared memory 22 mainly used to store various control information and commands, such as system configuration information relating to the overall configuration of the storage system 3. The pool area management table 30 (FIG. 3) described later is also stored in this shared memory 22. Furthermore, the cache memory 23 is mainly used to temporarily store data input/output to or from the storage system 3.

Each disk adapter 24 is constructed as a microcomputer system having a microprocessor, memory, and the like, and functions as an interface performing protocol control during communication with each disk unit 12 of the storage device unit 10. These disk adapters 24 are connected to the corresponding disk units 12 in the storage device unit 10 via, for example, a fiber channel cable 26, and also provide or receive data to or from these disk units 12 in accordance with the fiber channel protocol.

The management terminal 25, which controls the overall operation of the storage system 3, is connected to the channel adapters 20 via a LAN 27, and is also connected to the disk adapters 24 via a LAN 28. The management terminal 25 monitors whether or not any failure is present in the storage system 3, and when any failure arises, informs the management console 4, and performs blockage processing for the corresponding disk unit 12 in the storage device unit 10 based on a command from the management console 4 in accordance with an operator's instructions. The operator can define system configuration information using the management terminal 25, and also store the defined system configuration information in the shared memory 22 via any channel adapter 20 or disk adapter 24, and the connecter 21.

The management console 4 consists of, for example, a personal computer, workstation, or computer such as a hand-held terminal, and is connected to the management terminal 25 of the storage system 3 via a LAN 29. The management console 4 includes: a display for displaying a GUI (Graphical User Interface) for performing various settings on the storage system 3, and various information; an input device, such as a keyboard or mouse, for the operator to use for various instructions or various input for settings; and a communication device for communicating with the management terminal 25 of the storage system 3 via the LAN 29. Furthermore, the management console 4 executes various processing based on various instructions input via the input device. For example, the management console 4 displays on the display various information, such as failure information, received from the management terminal 25 of the storage system 3, or sends various settings input using the GUI displayed on the display to the management terminal 25 of the storage system 3.

(2) Data Input/Output Processing in the Storage System 3

Figure 2:
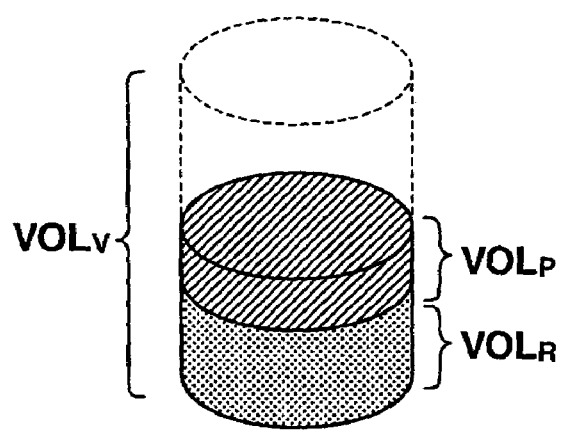
FIG. 2 is a conceptual diagram for explaining setting of storage capacity in the storage controller according to the embodiment of the present invention.

Next, data input/output processing in the storage system 3 according this embodiment will be described. FIG. 2 conceptually indicates storage capacity that can be set in the storage system 3. In this storage system 3, a virtual logical volume (hereinafter, referred to as the "virtual logical volume VOLv") with storage capacity of a size larger than that of its real storage capacity (hereinafter, referred to as the "real storage capacity"), e. g., one that would be attained by future extension, can be defined and set as the overall storage capacity of the storage device unit 10, using the management terminal 25. The content of this definition and setting is transferred to the shared memory 22 via any one of the channel adapters 20 or disk adapters 24, and stored in the shared memory 22 as part of the system configuration information, under the control of the management terminal 25.

When a command for confirming the storage capacity of the storage system 3 is transmitted from the host computer 2, the channel adapter 20 replies by communicating the storage capacity of the preset virtual volume VOLv. For example, when a Read Capacity command defined by the SCSI (Small Computer System Interface) is sent from any host system 2, the channel adapter 20 that receives the Read Capacity command refers to the system configuration information stored in the shared memory 22, generates status information based on the storage capacity of the virtual volume VOLv, and then transmits it to the host system 2.

In this storage system 3, using the management terminal 25, a part of the overall storage capacity of the actual storage device unit 10 can be defined and set as a logical volume $VOL_R$ for performing ordinary read/write operations (hereinafter, referred to as the "real volume"), and the remaining storage capacity can be defined and set as a pool area $VOL_P$. This pool area $VOL_P$ is used as a buffer storage area for storing data transmitted from a host system 2 with a logical address other than those in the real volume $VOL_R$ of the virtual volume $VOL_V$ designated as the position where the data is to be written, until the future extension of the real volume $VOL_R$. The content of this definition and setting is transferred to the shared memory 22 via any of the channel adapters 20 or the disk adapters 24, and then stored in the shared memory 22 as part of the system configuration information.

Furthermore, in the storage system 3, with regard to the storage area of the real volume $VOL_R$, so that a host system 2 can designate an address (LU and LBA) to immediately access the corresponding storage area, the logical addresses recognized by the host system 2, and the physical addresses in the storage device unit 10 correspond in a one-to-one basis with each other in a fixed manner, and an address conversion table indicating the correspondence of these addresses is stored in the shared memory 22 as part of the system configuration information.

Upon receiving a logical address-designated data input/output request from a host system 2, the storage system 3, if the logical address contained in that data input/output request where data is to be written/read corresponds to any storage area in the read volume $VOL_R$, converts the logical address to a physical address using the address conversion table, and then the data is read out of or written in the position of that physical address.

Meanwhile, in the storage system 3, with regard to the storage area of the pool area $VOL_P$, the logical addresses recognized by the host system 2, and the physical addresses in the storage device unit 10 where data is actually written or read do not correspond in a one-to-one basis with each other in a fixed manner, and the storage area where data is to be written is dynamically allocated each time a data write request designating a storage area other than those of the real volume $VOL_R$ of the virtual volume $VOL_V$ is received from the host system 2.

Figure 3:
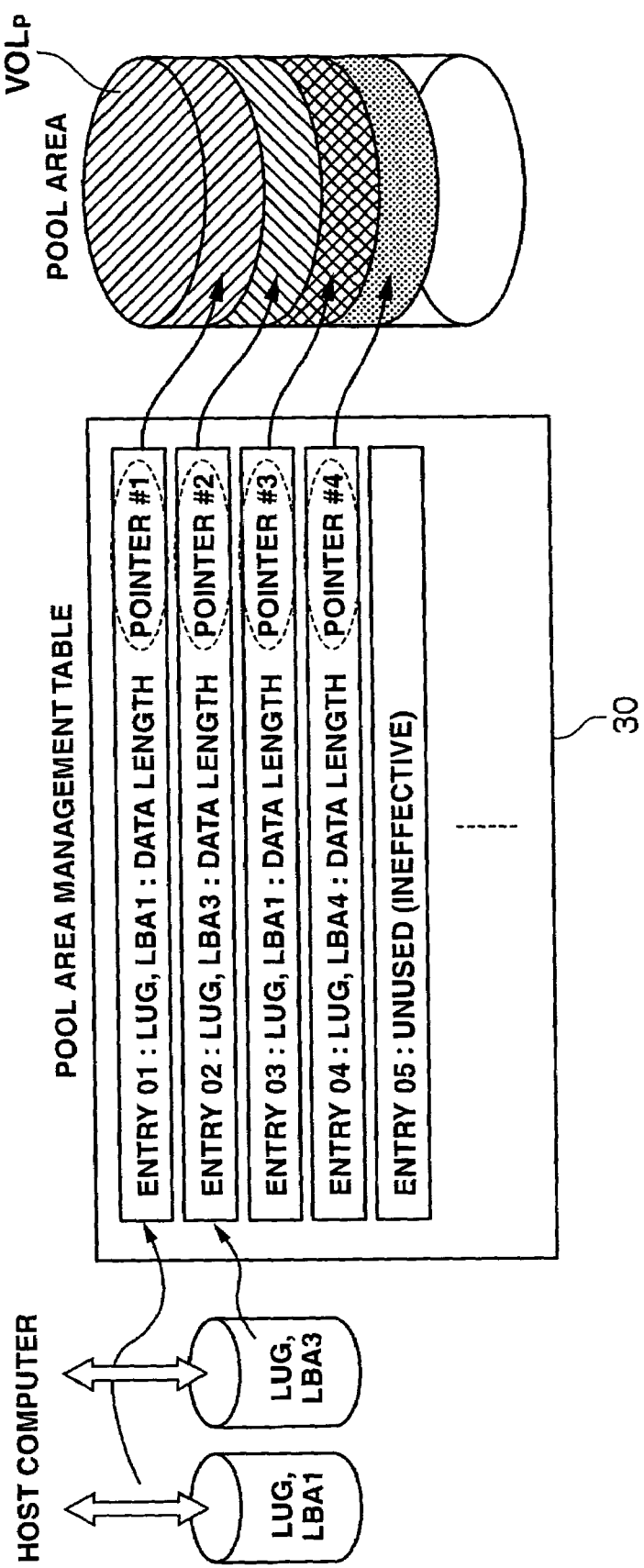
FIG. 3 is a conceptual diagram explaining a pool area management table.

Therefore, as shown in FIG. 3, the shared memory 22 stores, as a means for managing data stored in the pool area $VOL_P$, a pool area management table 30 having an entry number column ("ENTRY n [n=1, 2, . . . ]"), an address information column ("LU, LBA"), a data length information column ("DATA LENGTH"), and a pointer information column ("POINTER # n [n=1, 2 . . . ]")

The storage system 3, upon receiving from the host system 2 a data write request designating a logical address that is in the virtual volume $VOL_V$, but exceeds the range of the real volume $VOL_R$, writes the data in the pool area $VOL_P$, while assigning an entry number to the data, and then storing that entry number in the entry number column of the pool area management table 30 as entry number information.

Furthermore, the storage system 3 stores a logical address (LU and LBA) designated by the host system 2 as a position where the data is to be written, i.e., contained in the data write request, in the address information column of the pool area management table 30 as address information, and also stores the data length of that data in the data length information column of the pool area management table 30 as data length information. Furthermore, the storage system 3 stores the top logical address of the storage area in the pool area $VOL_P$ where the data has actually been stored in the pointer information column of the pool area management table 30 as pointer information.

The storage system 3, upon receiving from any host system 2 a data read request designating a logical address that is in the virtual volume $VOL_V$, but exceeds the range of the real volume $VOL_R$, detects the position in the pool area $VOL_P$ where the corresponding data is stored based on the pool area management table 30, and reads the data from the pool area $VOL_P$ based on the detection result, and sends it to the corresponding host system 2.

Only processing at the interfaces to the host systems 2 is performed based on the storage capacity of the virtual volume $VOL_V$, and internal processing, such as formatting, in the storage system 3 is performed based on the sum storage capacity of the real volume $VOL_R$ and the pool area $VOL_P$.

Figure 4:
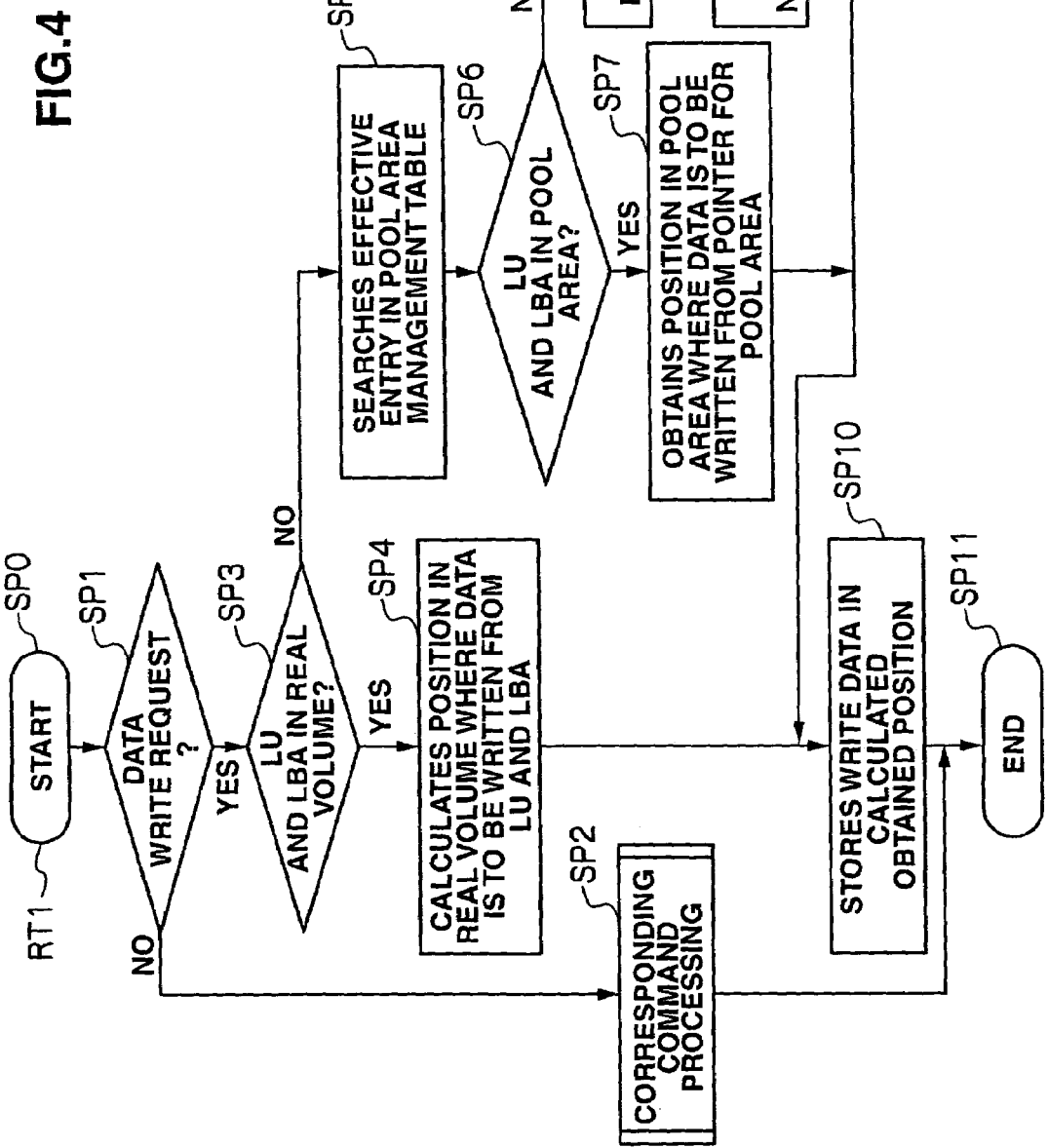
FIG. 4 is a flowchart indicating first data input/output processing procedures.

FIG. 4 is a flowchart indicating a series of processing procedures conducted in the storage system 3 (hereinafter, referred to as "first data I/O processing procedures RT1"), from among the above-described data input/output processing in the storage system 3, conducted when a command (specifically, a data write request) is sent from any host system 2.

In the storage system 3, when a channel adapter 20 receives a command from a host system 2, processing according to the first data I/O processing procedures RT1 commences, and first, the channel adapter 20 judges whether or not the command is a command for a data write request (SP1).

If the command is not a command for a data write request (SP1: NO), processing according to the command is performed in the storage system 3 (SP2), and then the processing relating to the command ends (SP11).

Meanwhile, if the command is a command for a data write request (SP1: YES), the channel adapter 20 that has received the data write request extracts the logical address (LU and LBA) of the storage area where the data is to be written, which is contained in that data write request, and judges whether the logical address is a logical address corresponding to a storage area in the real volume $VOL_R$, based on the extracted logical address, and the system configuration information stored in the shared memory 22 (SP3).

If the logical address is a logical address corresponding to a storage area in the real volume $VOL_R$ (SP3: YES), the channel adapter 20 stores the data write request in the shared memory 22, and also writes the data to be written received together with the data write request in the cache memory 23.

At this time, each disk adapter 24 is constantly monitoring the shared memory 22. The corresponding disk adapter 24, upon detecting the data write request written in the shared memory 22, calculates a physical address in the real volume $VOL_R$ based on the logical address contained in the data write request (SP4), reads the data to be written from the shared memory 23, and then sends it to the corresponding disk unit 12 in the storage device unit 10. Consequently, the data is stored in the corresponding address position in that disk unit 12 (SP10). Then, the storage system 3 ends the processing relating to the command (SP11).

Meanwhile, if the logical address where data is to be written, which is contained in the data write request from the host system 2, is not a logical address corresponding to a storage area in the real volume $VOL_R$ (SP3: NO), the channel adapter 20 sequentially compares the logical address contained the data write request, and each of the logical addresses stored in the address information column of the entries registered in the pool area management table 30 (SP5).

Subsequently, the channel adapter 20 judges whether or not the logical address contained in the data write request corresponds to any of the logical addresses stored in the address information column of the entries in the pool area management table 30, i.e., whether or not data has already been stored in the position of the logical address contained in the data write request (SP6).

An affirmative result at this step (SP6: YES) means that the data write request from the host system 2 is an update request of data previously stored in the pool area $VOL_P$. Thus, the channel adapter 20 reads the logical address stored in the pointer information column of the corresponding entry in the pool area management table 30, generates a new data write request wherein the logical address where the data is to be written, which is contained in the data write request from the host system 2, has been replaced with the read logical address, and then stores that new data write request in the shared memory 22 (SP7).

Consequently, the data to be written is read by the corresponding disk adapter 24 from the cache memory 23 based on this data write request, and then is stored in the corresponding address position in the corresponding disk unit 12 (SP10). Subsequently, the storage system 3 ends the processing relating to the command (SP11).

Meanwhile, a negative result (SP5: NO) means that the data write request from the host system 2 is a request for writing new data. Accordingly, at this time, the corresponding channel adapter 20 reserves an unused entry in the pool area management table 30 for that data (SP8).

Furthermore, the channel adapter 20 then stores corresponding information relating to the data in each corresponding column of the newly reserved unused entry in the pool area management table 30, thereby registering the data in the pool area management table 30. More specifically, the channel adapter 20 reserves an unused storage area in the pool area $VOL_P$ to store the data, and stores the logical address at the top of that area in the pointer information column of the newly reserved unused entry at step SP8, as well as storing the entry number assigned with regard to the data, the logical address designated by the host system 2 where the data should be stored (the logical address where the data is to be stored, which is contained in the data write request from the host system 2), and the data length of the data, in the respective entry number, logical address information and data length information columns of the newly reserved unused entry.

In this embodiment, as a technique for reserving a storage area in the pool area $VOL_P$, a method in which only an unused storage area equivalent to the data length of the data is reserved from the top address of the pool area $VOL_P$ is used. Adoption of this method eliminates wasteful use of storage area, and conserves the storage capacity of the pool area $VOL_P$, compared to the case where data is randomly stored in the pool area $VOL_P$.

Subsequently, the channel adapter 20 reads the logical address stored in the pointer information column of the relevant entry in the pool area management table 30, generates a new data write request in which the logical address where the data is to be written, which is contained in the data write request from the host system 2, has been replaced with the read logical address, and then stores that new data write request in the shared memory 22 (SP9).

As a result, the data to be written is read by the corresponding disk adapter 24 out of the cache memory 23 based on the data write request, and then stored at the corresponding address position in the corresponding disk unit 12 (SP10). Then, the storage system 3 ends the processing relating to the command (SP11).

Figure 5:
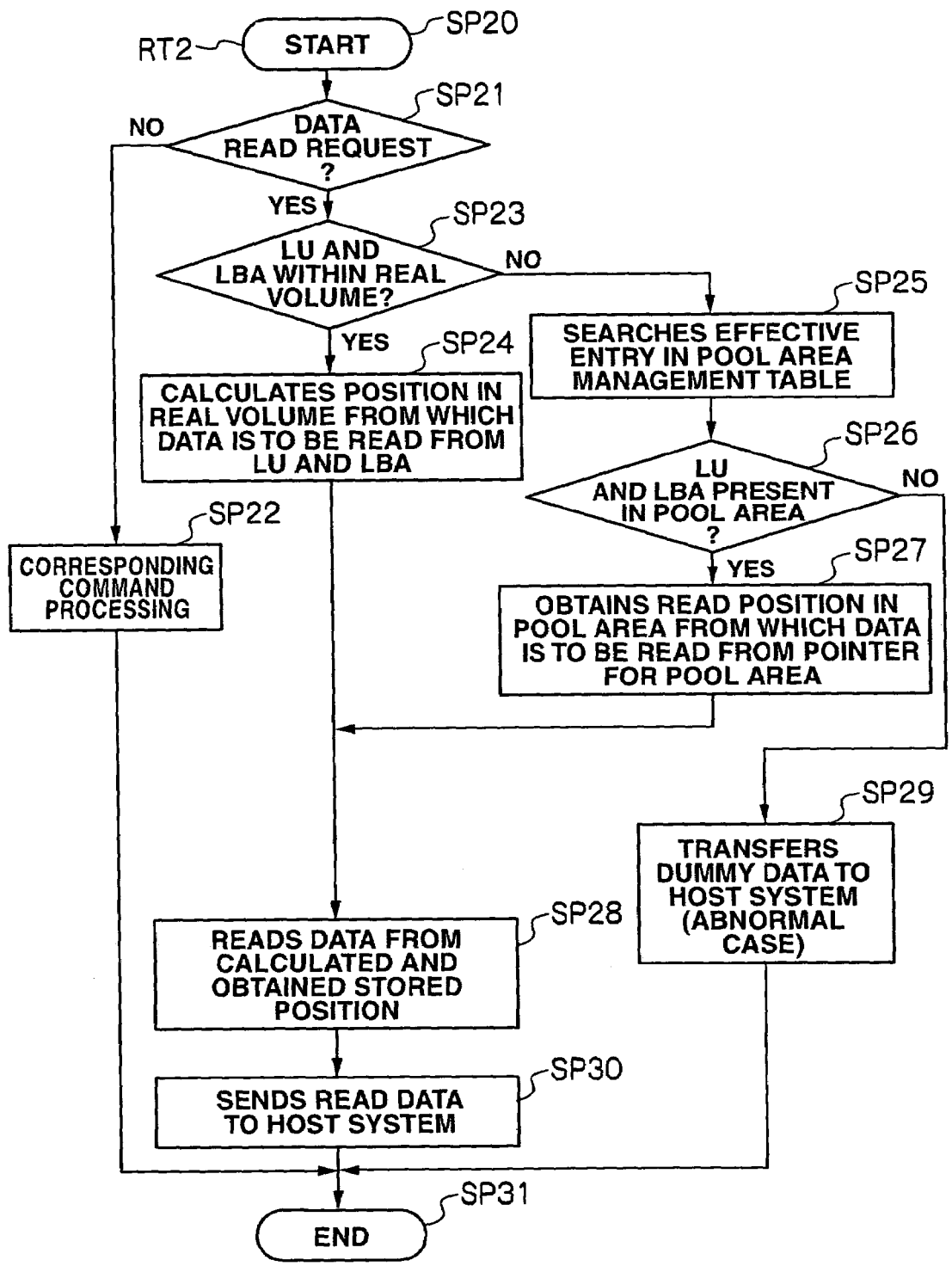
FIG. 5 is a flowchart indicating second data input/output processing procedures.

Meanwhile, FIG. 5 is a flowchart indicating a series of processing procedures (hereinafter, referred to as the "second data I/O processing procedures RT2") performed when a command from a host system 2 is judged to be a data read request at step SP2 of the first data I/O processing procedures RT1.

A channel adapter 20 that has received a command from the host system 2, upon proceeding to step SP2 of the first data I/O processing procedures RT1, first judges whether or not the command is a command for a data read request in accordance with the second data I/O processing procedures RT2 (SP21).

Then, if the command is not a command for a data read request (SP21: NO), processing according to the command is performed in the storage system 3 (SP22), and subsequently, the processing relating to the command ends (SP31).

Meanwhile, if the command is a data read command (SP21: YES), a channel adapter 20 that has received that command extracts the logical address in the storage area where data to be read is written, which is contained in the data read request, and judges whether or not the extracted logical address is an address corresponding to a storage area in the real volume $VOL_R$ based on the extracted logical address, and the system configuration information stored in the shared memory 22 (SP23).

In this case, the result of the judgment will be affirmative when the data to be read is stored in the real volume $VOL_R$ (SP23: YES). Then, the channel adapter 20 stores this data read request in the shared memory 22.

This data read request is subsequently read by the corresponding disk adapter 24. The disk adapter 24 then calculates a physical address in the real volume $VOL_R$ corresponding to the logical address contained in the data read request to control the corresponding disk unit 12 based on the calculation result (SP24), thereby reading the data to be read from the corresponding address position in the disk unit 12 (SP28). Moreover, the disk adapter 24 stores the data read from the disk unit 12 (hereinafter, referred to as "read data") in the cache memory 23, and also the read command in the shared memory 22.

At this time, each channel adapter 20 is constantly monitoring the shared memory 22. The corresponding channel adapter 20, upon detecting the read command written in the shared memory 22, reads the corresponding read data from the cache memory 23 based on that read command, and sends it to the corresponding host system 2 (SP30). Then, the storage system 3 ends the processing relating to the command (SP31).

Meanwhile, when the data to be read is not stored in the real volume $VOL_R$, the result of the judgment at step SP23 is negative (SP23: NO). Then, the channel adapter 20 sequentially compares the logical address of the data to be read contained in the data read request, and each of the logical addresses stored in the address information column for the entries registered in the pool area management table 30 (SP25).

Subsequently, the channel adapter 20 judges whether or not the logical address where the data to be read is stored corresponds to any of the logical addresses stored in the address information column for the entries registered in the pool area management table 30 (SP26).

An affirmative result at this step (SP26: YES) means that the data read request from the host system 2 is directed to data stored in the pool area $VOL_P$. Then, the channel adapter 20 reads the logical address stored in the pointer information column for the corresponding entry in the pool area management table 30, generates a new data read request in which the logical address where the data is to be read, which is contained in the data read request from the host system 2, has been replaced with the read logical address, and then stores that new data write request in the shared memory 22 (SP27).

As a result, the data read request is read by the corresponding disk adapter 24 from the shared memory 22, a physical address in the pool area $VOL_P$ corresponding to the logical address contained in the data read request is calculated (SP27), and then the data to be read is read from the corresponding disk unit 12 in the storage device unit 11 based on the calculation result (SP28). Furthermore, the disk adapter 24 stores the read data read from this disk unit 12 in the cache memory 23, and also stores the read command in the shared memory 22.

Consequently, as in the above case, the read data is read by the corresponding channel adapter 20, and sent to the corresponding host system 2 (SP30). The storage system 3 then ends the processing relating to the command (SP31).

Meanwhile, a negative result at step SP26 (SP26: NO) means that data subject to the data read request from the host system 2 is stored neither in the real volume $VOL_R$ nor in the pool area $VOL_P$. In that case, the channel adapter 20 sends dummy data of all "0"s to the corresponding host system 2 (SP29). Then, the storage system 3 ends the processing relating to the command (SP31).

(3) Pool Area Access Performance Display Function in the Storage System 3

In the storage system 3 with the above-described configuration, a method in which at the point in time when data to be written appears, only a storage area equivalent to the data length of that data is allocated sequentially from the top of the pool area $VOL_P$ is used as a technique for reserving a storage area in the pool area $VOL_P$ where new data is to be written, as described above. Accordingly, in the storage system 3, data in the pool area $VOL_P$ is not placed in the order assigned to the logical address (LU, LBA) recognized by the host system 2 with regard to the data.

As a result, in the storage system 3, because, firstly, when accessing data stored in the pool area $VOL_P$, it is necessary to search all of the entries in the pool area management table 30 in the shared memory 22, and secondly, data that should be read or written with one command may not be stored sequentially at one position, but stored distributed among a plurality of separate storage areas, access performance for data stored in the pool area $VOL_P$ deteriorates compared to that for data stored in the real volume $VOL_R$. Specifically, due to the latter reason, there is a case where a plurality of data transfers may be required to collect data stored in a manner distributed among the plurality of separate storage areas. In that case, extra transfer time is needed compared to the case where only one transfer is required.

Therefore, in the storage system 3 according to this embodiment, which has the above-described configuration, the frequency of data input/outputs designating a logical address outside the range of the real volume $VOL_R$, and as data stored in the pool area $VOL_P$ increases, average access performance for the data deteriorates.

In these cases, in the storage system 3 according to this embodiment, as a method for reserving a storage area to store data in the pool area $VOL_P$, a method in which the pool area $VOL_P$ is allocated sequentially from the top is adopted, and therefore, the remaining unused storage area of the pool area $VOL_P$ can easily be calculated from the address information (LU, LBA) stored in the address information column for the last effective entry (the entry data of which has been registered) in the pool area management table 30. The access performance for data stored in the pool area $VOL_P$ can be calculated by measuring the time required from the start to the end of processing for each access (data write or read operation) to the pool area $VOL_P$, and obtaining the average.

Therefore, in the storage system 3 according to this embodiment, each time any of the channel adapters 20 receives a data input/output request to write or read data to or from the pool area $VOL_P$ (data write request/data read request), the time required from the start to the end of processing for writing or reading the designated data is measured with an internal timer (not shown), and the remaining unused storage area of the pool area $VOL_P$ after the processing is calculated based on the pool area management table 30, and the measurement and calculation results are sent out to the management terminal 25.

The management terminal 25 sends the measurement and calculation results received from the channel adapter 20 to the management console 4, and the management console 4 displays the measurement and calculation results on a monitor in response to the operator's instruction.

As described above, in the storage system 3, the operator can properly judge the time for adding on disk units 12 based on the pool area $VOL_P$ access performance displayed on the monitor at the management console 4, and the remaining amount of the pool area $VOL_P$.

(4) Disk Unit Addition Data Relocation Processing

Next, disk unit addition data relocation processing will be explained below.

In the storage system 3 according to this embodiment, addition of storage capacity can be conducted even during operation of the system. More specifically, first, physical disk capacity (disk unit 12) in the storage device unit 11 is added, and subsequently, the system configuration information is updated including the storage capacity of the real volume $VOL_R$ and pool area $VOL_P$, and that of the virtual volume $VOL_V$ (when needed) after the addition, all using the user interface of the management terminal 25. Then, using the management terminal 25, that new system configuration information is sent, together with a data relocation processing execution command, from the management terminal 25 to a given channel adapter 20 or disk adapter 24 via a LAN.

Figure 7:
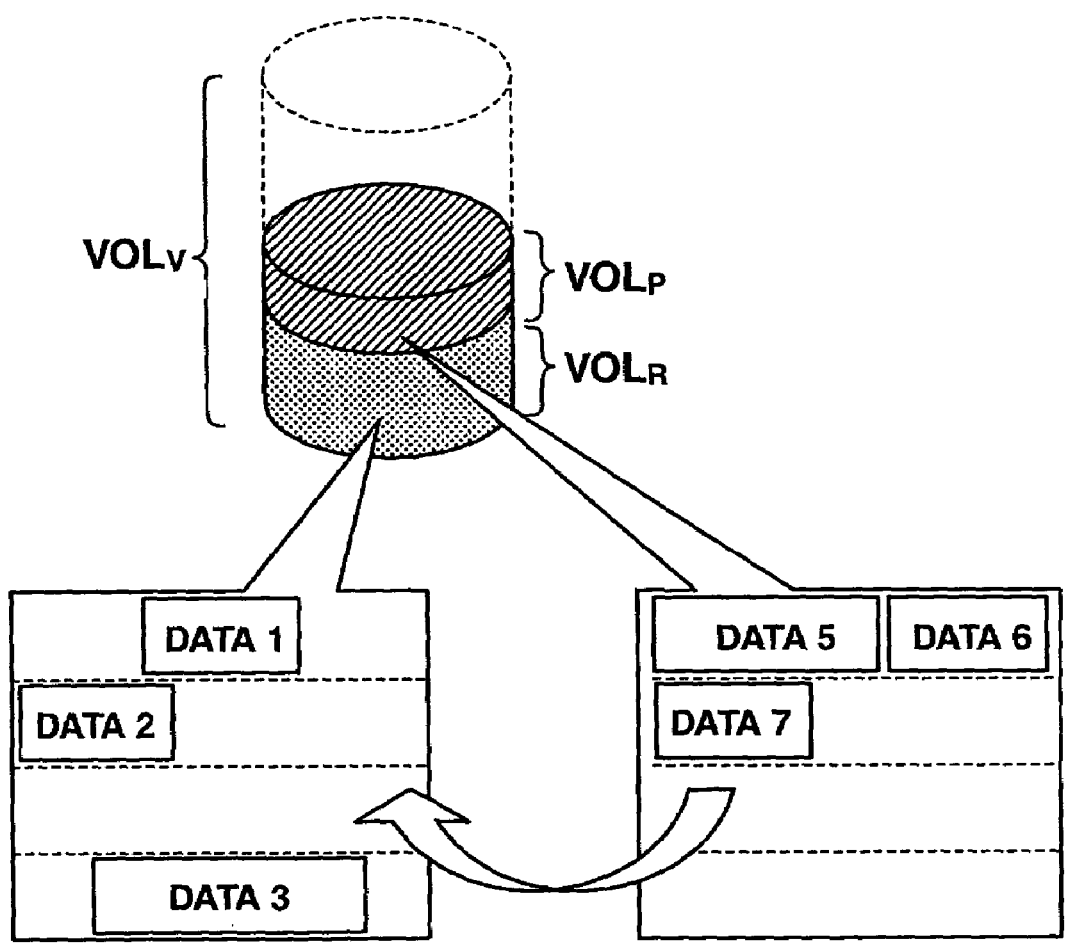
FIG. 7 is a conceptual diagram for explaining data relocation processing.

Here, the channel adapter 20 or disk adapter 24, upon receiving the new system configuration information, updates the system configuration information by replacing the system configuration information stored in the shared memory 22 with the new system configuration information. Under the control of the management terminal 25, the channel adapter 20 or disk adapter 24, as shown in FIG. 7, copies the data of an entry to be written in the extended real volume $VOL_R$ from among all the entries registered in the pool area management table 30 stored in the shared memory 22, from the pool area $VOL_P$ to the corresponding address position in the real volume $VOL_R$, based on the data relocation processing execution command. Hereinafter, the above processing for relocating data stored in the pool area $VOL_P$ to the corresponding address position in the extended real volume $VOL_R$ is referred to as "data relocation processing."

Figure 6:
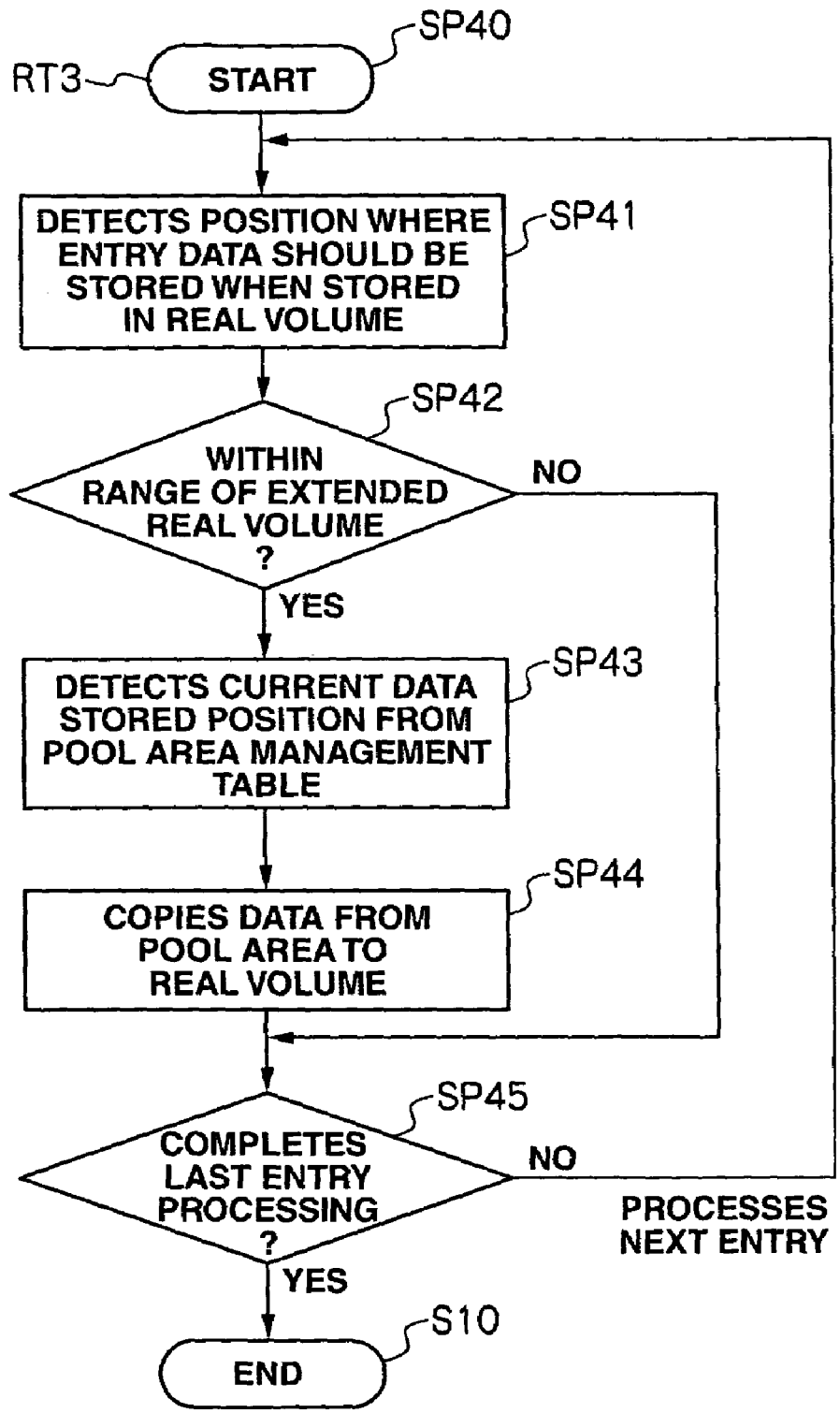
FIG. 6 is a flowchart indicating data relocation processing procedures.

FIG. 6 is a flowchart indicating the aforementioned data relocation processing procedures performed in the storage system 3 (hereinafter, referred to as "data relocation processing procedures RT3").

In the storage system 3, after the extension of the real volume $VOL_R$, the operator operates the management terminal 25 so that the system configuration information including the storage capacity of the real volume $VOL_R$ after that extension is updated in the manner described above. Then, when the management terminal 25 is used to input a command to execute data relocation processing, the data relocation processing procedures RT3 are started. With regard to an entry registered in the pool area management table 30, the channel adapter 20 or disk adapter 24 that has received the data relocation processing execution command from the management terminal 25 reads the logical address registered in the address information column where the entry should be stored (SP41), and then judges whether or not the logical address is within the range of that extension of the real volume $VOL_R$ (SP42).

The channel adapter 20 or disk adapter 24, upon obtaining a negative result in this judgment (SP24: NO), proceeds to the processing at step SP45 described later, while, upon an affirmative result (SP42: YES), reads the logical address in the pool area $VOL_P$ where the entry is currently stored, based on the pointer information column for the entry in the pool area management table 30 (SP43).

Then, the channel adapter 20 or disk adapter 24 sequentially reads the data in units of logical blocks, from the pool area $VOL_P$ based on the logical address, obtained at step SP41, where the data should be stored, and the logical address, obtained at step SP43, where the data is currently stored, and then sequentially copies the data to the corresponding address position in the real volume $VOL_R$, i.e., the position where the logical address stored in the address information column of the pool area management table 30 is the top address (SP44).

More specifically, the channel adapter 20 or disk adapter 24 that has received the data relocation processing execution command stores the data relocation processing execution command including the logical addresses respectively obtained at steps SP41 and SP43 in the shared memory 22.

Then, the data relocation processing command is read out by a disk adapter 24 that reads or writes data from or to the logical address obtained at SP41, where the data should be stored (hereinafter, referred to as the "copy destination disk adapter 24"), and a disk adapter 24 that reads or writes data from or to the logical address obtained at step SP43, where the data is currently stored (hereinafter, referred to as the "copy source disk adapter 24").

The copy source disk adapter 24 reads data to be relocated from the corresponding disk unit 12 of the storage device unit 10, and stores it in the cache memory 23. The copy destination disk adapter 24 reads this data from the cache memory 23, and has it stored in the corresponding address position in the corresponding disk unit 12. Consequently, data relocation is completed.

Furthermore, concurrently with the above processing, the channel adapter 20 or disk adapter 24 that has received the data relocation processing execution command deletes the information relating to the corresponding entry in the pool area management table 30, thereby canceling the setting of that entry (SP44). After the cancellation of that entry setting, it is possible to overwrite that entry, thereby re-using the storage area in the pool area $VOL_P$ where the data had been stored.

Next, the channel adapter 20 or disk adapter 24 judges whether or not the aforementioned processing at steps SP41 to SP44 has been completed with regard to all of the entries registered in the pool area management table 30 (SP45).

The channel adapter 20 or disk adapter 24, upon a negative result in this judgment (SP45: NO), returns to step SP41, and then repeats the same processing until the processing is completed with regard to all of the entries registered in the pool area management table 30 (i.e., until an affirmative result is obtained at step SP45) (SP41 to SP45).

Subsequently, the channel adapter 20 or disk adapter 24, upon the completion of the above processing at steps SP41 to SP44 with regard to all of the entries registered in the pool area management table 30 (i.e., upon obtaining an affirmative result at step SP45), ends this series of data relocation processing (SP47).

At step SP44 of the above data relocation processing procedures RT3, during data relocation (data copy) of an entry, a data write request to update the entry data may be transmitted from the host system 2 to the storage system 3.

In that case, the relevant entry in the pool area management table 30 has not been set to be ineffective (i.e., deleted) at that stage. Thus, the channel adapter 20 that has received the data write request, as described with regard to step SP7 in the first data I/O processing procedures RT1 (FIG. 4), reads the logical address stored in the pointer information column for the relevant entry in the pool area management table 30, generates a new data write request in which the data write destination logical address contained in the data write request from the host system 2 has been replaced with the read logical address, and stores it in the shared memory 22. Concurrently, the channel adapter 20 stores the data to be written in the cache memory 23. Then, the data write request written in the shared memory 22 is read out of the shared memory 22 by the copy source disk adapter 24.

Here, the copy source disk adapter 24 transfers data in the logical block for which data relocation has been completed (i.e., the data transfer to the copy destination disk adapter 24 via the cache memory 23 has been completed), to the copy destination disk adapter 24 via the cache memory 23 with reference to the status of the data copy, thereby storing the data in the logical block, in the corresponding address position in the copy destination disk unit 12.

Meanwhile, the copy source disk adapter 24 reads out of the cache memory 23 data in the logical block for which data relocation has not been completed (i.e., the data transfer to the copy destination disk adapter 24 via the cache memory 23 has not been completed), and stores it in the corresponding address position in the copy source disk unit 12.

As described above, in the storage system 3, when there is a request for an update to data during its being copied, the destination where the data is to be written is changed in units of logical blocks with reference to the status of the data copy, ensuring that the update to data during its being copied is reflected in the copied data.

(5) Effect of the Embodiment

Next, the advantages of building the storage system 3 as described above will be explained below with reference to FIG. 8. Here, a user who conducts maintenance on their database and redefines their storage area management software every two years is assumed as a standard case. Furthermore, in FIG. 8, x represents initial storage capacity, and y represents investment to obtain the storage capacity.

In the above case, assuming that the necessary storage capacity increases by 20% every six months, and that the cost required to provide storage capacity per unit decreases by 20% every six months, the storage capacity required two years later will amount to 207.4% of the initial storage capacity. Thus, in conventional methods, in order to finally secure a margin of 20%, it is necessary to provide in advance storage capacity approximately 2.5 times larger than that required for the initial phase.

Therefore, comparing the investment in the case where storage capacity is extended every six months with a pool area of 20% provided in the storage system 3 according this embodiment, and the case where storage capacity is provided in advance for future needs according to conventional methods, as shown in FIG. 8, the former case can reduce the investment by 24.2% compared to the conventional methods.

In the above case, in the storage system 3 according to this embodiment, if the storage capacity of the virtual volume $VOL_V$ is initially communicated to the host system 2 as that of the storage device unit 10 in the storage system 3 as described above, it is possible to extend the storage capacity of the storage device unit 10 up to that of the virtual volume $VOL_V$ irrespective of the host system 2. Moreover, until that extension, for a data input/output request designating an address in the virtual volume $VOL_V$ other than the real volume $VOL_R$, the pool area $VOL_P$ is used as a buffer until the storage capacity of the storage device unit 10 has been extended. Therefore, no failure will occur even when a data input/output request designating an address in the virtual volume $VOL_V$ other than the real volume $VOL_R$ has been received from the host system 2.

As a result, the above-described storage system 3 enables a reduction in the investment required for extension of its storage capacity, while suppressing the work burdens, such as re-initialization and reset of database and storage area management software accompanying the extension of the storage capacity. Accordingly, this storage system 3 enables facilitating the extension of its storage capacity while suppressing the investment thereto.

(6) Other Embodiments

The above-described embodiment relates to the case where each channel adapter 20 informs the management console 4 of the pool area $VOL_P$ access performance (time required for reading or writing data from or to the pool area $VOL_P$) and the remaining amount of the pool area $VOL_P$ via the management terminal 25, and the management console 4 displays the measurement and calculation results on a monitor in response to the operator's instruction.

However, the present invention is not limited to the above case, and may also be constructed so that the access the pool area $VOL_P$ performance and the remaining amount of the pool area $VOL_P$ are compared with the respective pre-determined threshold values, and if the access performance or the remaining amount of the pool area $VOL_P$ falls below the corresponding threshold value, a warning will be automatically sent to the manager of the management terminal 25.

Also, the access performance for the pool area $VOL_P$ and the remaining amount of the pool area $VOL_P$ may be displayed not at the management console 4, but at the management terminal 25. Furthermore, when a warning is sent as described above, the warning may be displayed on a monitor at the management terminal 25, and also, a warning beep may be output by the management terminal 25.

Moreover, the above-described embodiment relates to the case where the control unit 11 is constructed as shown in FIG. 1 as the storage controller 11 for controlling data input/output between the host systems 2, and the storage device unit 10 for storing data. However, the present invention is not limited to this case, and various other configurations can be extensively applied.

The present invention can be applied to a storage system designed to virtualize a storage area to provide it to a host system.

What is claimed is:

1. A storage controller for controlling data input/output between a host system and a storage device unit that stores data, the storage controller comprising:
an adapter unit;
a memory; and
a remaining pool area amount confirmation unit, wherein the adapter unit writes or reads relevant data to or from the storage device unit in response to a data input/output request from the host system, wherein the memory stores system configuration information including a definition, set externally, of a virtual volume provided to the host system and a definition, set externally, of a real volume and a pool area, and a pool area management information including an entry of each data stored in the pool area, wherein the virtual volume is defined and set as an overall storage capacity larger than a real storage capacity of the real volume, wherein the real volume is assigned to a first part of the virtual volume and is defined and set as a logical volume for performing ordinary read/write operations from/to the storage device unit, wherein the pool area is assigned to a second part of the virtual volume and is used as a buffer storage area for storing data, wherein a third part of the virtual volume is not yet assigned to both the real volume and the pool area, wherein in response to each of data input requests designating an address of the third part of the virtual volume from the host system, the adapter unit allocates data of each of the data input requests to a storage area in the pool area transparently to the host system, according to a method in which the allocated storage area is reserved sequentially from a top address of the pool area, so that a range of addresses of the pool area is exceeded, wherein the adapter unit copies data stored in the pool area to the real volume transparently to the host system and cancels the entry of the data stored in the pool area from the pool area management information so that a range of addresses of the real volume is exceeded and the data stored in the pool area can be re-used, wherein the adapter unit communicates, to the host system, the storage capacity of the virtual volume based on the system configuration information stored in the memory in response to a storage capacity confirmation request from the host system, wherein the remaining pool area amount confirmation unit confirms a remaining amount of the pool area by calculating based on an address for a last effective entry, of data stored in the pool area, in the pool area management information, wherein the remaining pool area amount confirmation unit communicates the confirmed remaining amount of the pool area to a management console, and wherein the management console displays on a monitor the remaining amount of the pool area based on the communication from the remaining pool area amount confirmation unit.

2. The storage controller according to claim 1, wherein the adapter unit, when writing data to the pool area, registers a position in the pool area where the data is to be written in the pool area management information, and in response to a data input/output request from the host system designating an address in the virtual volume other than the real volume, writes or reads the relevant data to or from the pool area with reference to the management table.

3. The storage controller according to claim 1, further comprising:

a pool area access performance confirmation unit, wherein the pool area access performance confirmation unit confirms access performance for the pool area, wherein the pool areas access performance confirmation unit communicates the confirmed access performance for the pool area to the management console, and wherein the management console displays on a monitor the access performance for the pool area based on the communication from the pool area access performance confirmation unit.

4. The storage controller according to claim 1, wherein the adapter unit copies the data stored in the pool area to the real volume based upon extension of the real volume.

5. A method for controlling a storage controller for controlling data input/output between a host system, and a storage device unit for storing data, the method comprising:

a first step for storing system configuration information including a definition, set externally, of a virtual volume provided to the host system, and a definition, set externally, of a real volume and a pool area, and a pool area management information including an entry of each of data stored in the pool area, wherein the virtual volume is defined and set as an overall storage capacity larger than a real storage capacity of the real volume, wherein the real volume is assigned to a first part of virtual volume and is defined and set as a logical volume for performing ordinary read/write operations from/to the storage device unit, wherein the pool area is assigned to a second part of virtual volume and is used as a buffer storage area for storing data, wherein a third part of the virtual volume is not yet assigned to both the real volume and the pool area, a second step, in response to each of data input requests designating an address of the third part of the virtual volume from the host system, for allocating data of each of the data input requests to a storage area in the pool area transparently to the host system, according to a method in which the allocated storage area is reserved sequentially from a top address of the pool area, so that a range of addresses of the pool area is exceeded, a third step for copying data stored in the pool area to the real volume transparently to the host system and canceling the entry of the data stored in the pool area from the pool area management information so that a range of addresses of the real volume is exceeded and the data stored in the pool area can be re-used, a fourth step for communicating, to the host system, the storage capacity of the virtual volume based on the stored system configuration information in response to a storage capacity confirmation request from the host system a remaining pool area amount confirmation step for confirming a remaining amount of the pool area by calculating based on an address for a last effective entry, of data stored in the pool area, in the pool area management information; and a remaining pool area amount communication step for communicating the confirmed remaining amount of the pool area to a management console, wherein the management console displays on a monitor the remaining amount of the pool area based on the communication.

6. The method for controlling a storage controller according to claim 5, wherein in response to a data input/output request from the host system designating an address in the virtual volume other than the real volume, the relevant data is written or read to or from the pool area with reference to the pool area management information.

7. The method for controlling a storage controller according to claim 5, wherein the second step includes:

a pool area access performance confirmation step for confirming access performance for the pool area; and a pool area access performance communication step for communicating the confirmed access performance for the pool area to the management console, and wherein the management console displays on a monitor the access performance for the pool area based on the communication.

8. The method for controlling a storage controller according to claim 5, wherein in the third step, when the real volume is extended, data, of the data stored in the pool area, is copied to the real volume.

* * * * *